United States Patent
De Vreede

(10) Patent No.: US 7,655,071 B2
(45) Date of Patent: Feb. 2, 2010

(54) PROCESS FOR COOLING DOWN A HOT FLUE GAS STREAM

(75) Inventor: Wilhelmus Jozef De Vreede, Wesseling (DE)

(73) Assignee: Shell Oil Company, Houston, TX (US)

( * ) Notice: Subject to any disclaimer, the term of this patent is extended or adjusted under 35 U.S.C. 154(b) by 35 days.

(21) Appl. No.: 12/097,271

(22) PCT Filed: Dec. 14, 2006

(86) PCT No.: PCT/EP2006/069696

§ 371 (c)(1),
(2), (4) Date: Jun. 13, 2008

(87) PCT Pub. No.: WO2007/068733

PCT Pub. Date: Jun. 21, 2007

(65) Prior Publication Data

US 2008/0276633 A1    Nov. 13, 2008

(30) Foreign Application Priority Data

Dec. 16, 2005    (EP)    .................................. 05112324

(51) Int. Cl.
*B01D 47/00*    (2006.01)
*B01F 3/04*    (2006.01)
(52) U.S. Cl. ............................... 95/187; 95/206; 95/231; 95/238; 95/288; 96/242; 261/128; 261/DIG. 9
(58) Field of Classification Search ................... 95/187, 95/206, 207, 230, 231, 236, 288; 96/234, 96/242; 261/128, DIG. 9
See application file for complete search history.

(56) References Cited

U.S. PATENT DOCUMENTS

| 1,172,429 | A | * | 2/1916 | Carrier | ........................... | 95/17 |
| 2,214,880 | A | * | 9/1940 | Crawford | ........................ | 95/10 |
| 2,525,045 | A | * | 10/1950 | Richardson | ..................... | 62/92 |
| 2,798,570 | A | * | 7/1957 | Kelley | ............................ | 95/18 |

(Continued)

FOREIGN PATENT DOCUMENTS

EP    551876    7/1993

(Continued)

*Primary Examiner*—Richard L Chiesa

(57) ABSTRACT

A process for cooling down a hot flue gas stream comprising water vapour and carbon dioxide, the process including: (a) heat exchange between the hot flue gas stream and a cooling water stream so that the hot flue gas stream is cooled to a cooled down gas stream at a temperature at which at least part of the water vapour therein has condensed and the cooling water stream increases in temperature; (b) combining the condensed water vapour and the cooling water stream to produce a combined water stream; (c) separation of the cooled down gas stream from the combined water stream; (d) cooling the combined water stream by contact with air from the atmosphere and by evaporation of a portion of the combined water stream; (e) using at least part of any non-evaporated and cooled water of the combined water stream as at least part of the cooling water stream for cooling the hot flue gas stream in step (a); and (f) storing any non-evaporated and cooled water of the combined water stream that is not used in step (e) and using the stored water later as at least part of the cooling water stream in step (a).

11 Claims, 1 Drawing Sheet

U.S. PATENT DOCUMENTS

| | | | | |
|---|---|---|---|---|
| 2,935,154 | A * | 5/1960 | Kelley | 95/11 |
| 3,347,019 | A * | 10/1967 | Barnhart | 203/20 |
| 4,246,072 | A * | 1/1981 | Brommel | 201/39 |
| 4,484,451 | A * | 11/1984 | Darm | 62/90 |
| 4,634,455 | A * | 1/1987 | Barta et al. | 95/194 |
| 5,084,074 | A * | 1/1992 | Beer et al. | 95/18 |
| 5,907,924 | A * | 6/1999 | Collin et al. | 95/194 |
| 5,958,110 | A * | 9/1999 | Harris et al. | 95/166 |
| 6,235,092 | B1 * | 5/2001 | Spencer | 96/242 |
| 6,284,022 | B1 * | 9/2001 | Sachweh et al. | 95/149 |
| 6,485,547 | B1 * | 11/2002 | Iijima | 96/242 |
| 6,625,977 | B2 * | 9/2003 | Lehman | 60/311 |
| 6,896,718 | B2 * | 5/2005 | Hallman | 95/231 |
| 7,306,654 | B2 * | 12/2007 | King et al. | 95/224 |
| 2002/0178920 | A1 * | 12/2002 | Margiott et al. | 95/273 |

FOREIGN PATENT DOCUMENTS

| | | | |
|---|---|---|---|
| JP | 54-6864 A | * | 1/1979 |
| JP | 61-216716 A | * | 9/1986 |
| WO | WO03080503 | | 10/2003 |
| WO | WO2004078643 | | 9/2004 |

* cited by examiner

PROCESS FOR COOLING DOWN A HOT FLUE GAS STREAM

The present application claims priority to European Patent Application 05112324.8 filed 16 Dec. 2005.

The present application is also the national stage of the International Application No. PCT/EP06/69696, filed on Dec. 14, 2006.

FIELD OF THE INVENTION

This invention provides a process for cooling down a hot flue gas stream comprising water vapour and carbon dioxide, in particular a hot flue gas stream from a steam methane reformer, more in particular but not exclusively from a steam methane reformer used in a Fischer-Tropsch process.

BACKGROUND OF THE INVENTION

The Fischer-Tropsch process can be used for the conversion of hydrocarbonaceous feed stocks into liquid and/or solid hydrocarbons. The feed (e.g. natural gas, associated gas and/or coal-bed methane, residual (crude) oil fractions or coal) is converted in a gasifier, optionally in combination with a reforming unit, into a mixture of hydrogen and carbon monoxide. This mixture is often referred to as synthesis gas or syngas.

The synthesis gas is then fed into a Fischer-Tropsch reactor where it is converted in a single step over a suitable catalyst at elevated temperature and pressure into paraffinic compounds ranging from methane to high molecular weight compounds comprising up to 200 carbon atoms, or, under particular circumstances, even more.

The hydrocarbons formed in the Fischer-Tropsch reactor typically proceed to a hydrogenation unit, optionally a hydroisomerisation/hydrocracking unit, and thereafter to a distillation unit.

The ratio of hydrogen to carbon monoxide produced by a gasifier is typically less than the optimum ratio preferred in a Fischer-Tropsch reactor. The hydrogen concentration in the gasifier synthesis gas can be increased by, for example, a Steam Methane Reformer (SMR) which can convert methane and steam to synthesis gas with a hydrogen:carbon monoxide ratio of around 5:1 to 7:1. This SMR synthesis gas can be used to increase the relative hydrogen content of the synthesis gas from a gasifier before it proceeds to a Fischer-Tropsch reactor. Typically, a SMR also produces sufficient hydrogen for use in other units or processes which are integral or associated with the Fischer-Tropsch process, for example a hydrogenation unit.

The steam reforming reaction is endothermic and the heat required for this reaction is typically provided by combusting a fuel gas. A combustion exhaust gas or flue gas is thus produced. Flue gas produced by a steam methane reformer or by gas turbines typically comprises water vapour, carbon dioxide, carbon monoxide, nitrogen, optionally small amounts of $C_2$-$C_6$ hydrocarbons and other gases. Individual components, in particular carbon dioxide, may be separated from the flue gas for subsequent sequestration.

In the prior art, many processes for separating carbon dioxide from flue gas or combustion exhaust gas are described. In EP 551 876, for example, is described a process for removal and recovery of carbon dioxide from combustion exhaust gas leaving a boiler. The process of EP 551 876 aims to reduce the decrease in overall power generation efficiency due to the recovery of carbon dioxide.

Before separation of carbon dioxide or other components, the flue gas is typically cooled using water. The cooling process results in water evaporation and so pure make-up water must be continuously added. The provision of pure water adds costs to the process, particularly in a hot climate where water availability is limiting.

SUMMARY OF THE INVENTION

The invention reduces the consumption of water in a process for cooling a hot flue gas.

The invention provides a process for cooling down a hot flue gas stream comprising water vapour and carbon dioxide, the process comprising:

(a) heat exchange between the hot flue gas stream and a cooling water stream so that the hot flue gas stream is cooled to a cooled down gas stream at a temperature at which at least part of the water vapour therein has condensed and the cooling water stream increases in temperature;

(b) combining the condensed water vapour and the cooling water stream to produce a combined water stream;

(c) separation of the cooled down gas stream from the combined water stream;

(d) cooling the combined water stream by contact with air from the atmosphere and by evaporation of a portion of the combined water stream;

(e) using at least part of any non-evaporated and cooled water of the combined water stream as at least part of the cooling water stream for cooling the hot flue gas stream in step (a); and (f) storing any non-evaporated and cooled water of the combined water stream that is not used in step (e) and using the stored water later as at least part of the cooling water stream in step (a).

With the process according to the invention, a surplus of non-evaporated water may be produced and stored during a period of time with a relatively low air temperature (such as during the night) and may be used during a period of time when the air temperature is relatively high (such as during the day.) The process provided by the invention thus saves on water consumption which is particularly useful in hot climates.

DETAILED DESCRIPTION OF THE INVENTION

Figure 1:
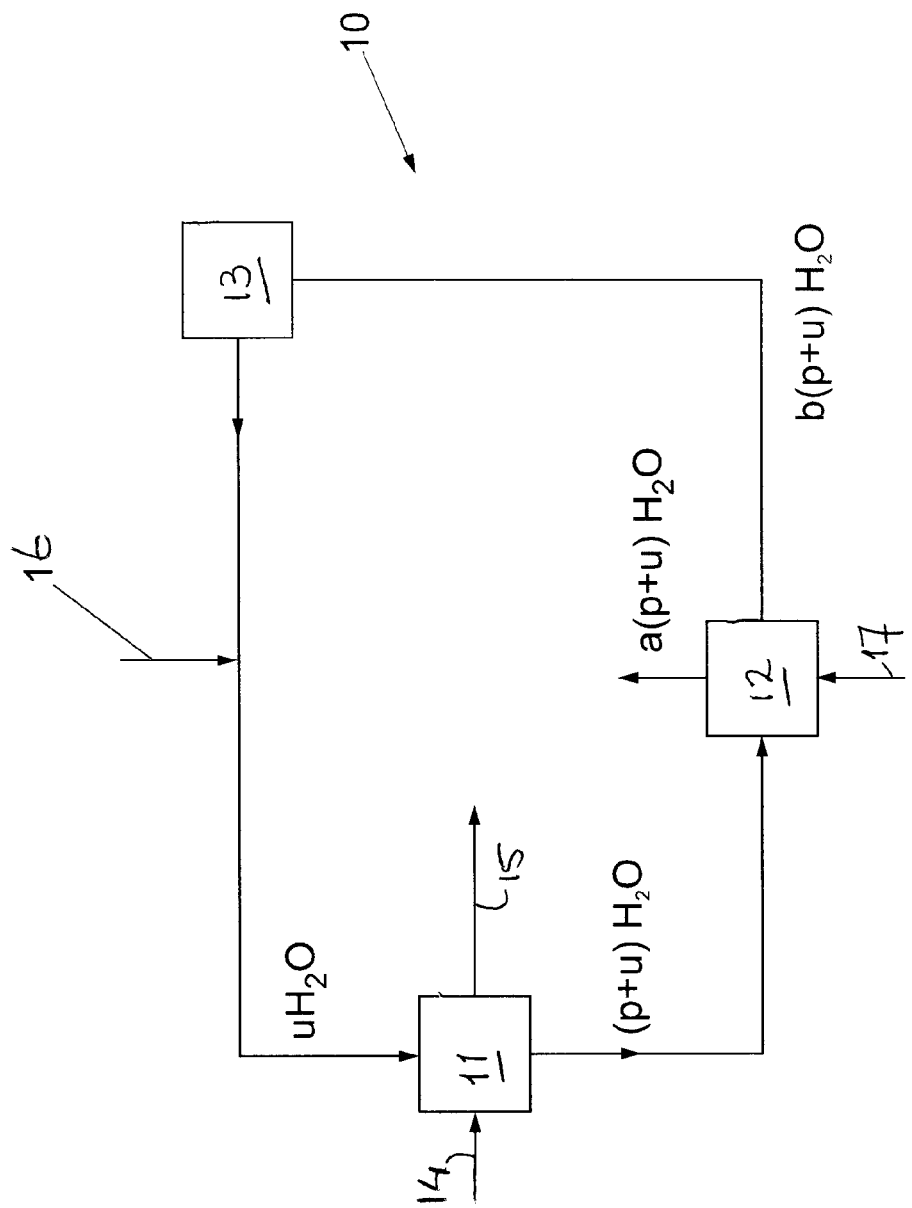
In FIG. 1 is shown a flow diagram of a cooling circuit for steam methane reforming flue gas.

In step (a) of the process according to the invention, a hot flue gas stream is cooled to a cooled down gas stream by heat exchange between the hot flue gas stream and a cooling water stream at a temperature at which at least part of the water vapour therein has condensed and the cooling water stream increases in temperature.

The hot flue gas stream may be any flue gas stream, preferably a flue gas stream selected from a gas turbine flue gas, a furnace flue gas, a hot oil furnace flue gas, a preheater flue gas, or a reformer flue gas, more preferably a steam methane reformer flue gas.

The hot flue gas stream preferably has a temperature in the range of from 120 to 360° C., more preferably of from 160 to 200° C.

The hot flue gas stream typically comprises 2-30% carbon dioxide, preferably 3-15% carbon dioxide. The proportion of carbon dioxide in the hot flue gas stream varies to an extent with the proportion of carbon dioxide in a fuel gas mixture which is at least partially combusted to produce the hot flue gas stream. For example, off-gas from a pressure swing adsorption unit (which contains carbon dioxide) may or may not be added to the fuel gas which, if added, would typically increase the proportion of carbon dioxide contained in the fuel gas mixture and therefore also increase the proportion of carbon dioxide in the hot flue gas stream.

Preferably, the heat exchange in step (a) is achieved through direct contact of the hot flue gas stream and the cooling water stream. Alternatively, indirect cooling may be used.

Preferably the cooling water stream is substantially water, more preferably 100% water. The cooling water stream preferably is, before being subjected to heat exchange with the hot flue gas, at ambient temperature.

The water vapour that is condensed in heat exchange step (a) is combined with the heated cooling water stream to produce a combined water stream and the cooled down gas stream. The combined water stream produced in step (b) preferably has a temperature in the range of from 30 to 80° C., more preferably in the range of from 40 to 70° C.

In step (d) of the process according to the invention, the combined water stream is cooled by contacting it with air from the atmosphere and by evaporation of a portion of the combined water stream. Preferably, the cooling in step (d) is achieved by directly contacting the combined water stream with the air in a cooling tower.

At least part of the cooled water of the combined water stream that is not evaporated in cooling step (d) is used as at least part of the cooling water stream in step (a). The surplus of cooled non-evaporated water of the combined water stream, i.e. the part not used as cooling water stream in step (a), is stored and later used as at least part of the cooling water stream in step (a).

Typically where the amount of water vapour condensed in step (a) is more than the amount of water which is evaporated in step (d), a portion of the non-evaporated and cooled water of the combined water stream is stored in a storage tank typically suitable for use when the amount of water vapour condensed from the hot flue gas stream is less than the amount of water which is evaporated in step (d).

Typically, the amount of water evaporated in step (d) depends on the air temperature and the air temperature depends on the prevailing weather conditions and time of day at any particular moment. In particular, the air temperature normally varies over a 24-hour period from a relatively cool temperature during the night to a relatively hot temperature during the day. This variance in turn causes a variance in the amount of water evaporated. The temperature variance between day and night in some climates may be more than 20° C., sometimes more than 30° C., sometimes more than 40° C. Thus, the amount of water evaporated during night time hours is typically less than the amount of water evaporated during daytime hours.

Thus, typically a surplus of non-evaporated water may be produced and stored during a period of time with a relatively low air temperature and may be used during a period of time when the air temperature is relatively high.

Preferably, the process is a continuous process for at least 24 hours, it should preferably contain at least a day and a night.

Water may be added to the process to make up for evaporated water. The amount of water added may be varied depending on the amount of water in the hot flue gas stream and depending on the amount of water in the tank. Typically water from the tank, when available, is used preferentially to water being added to the process.

The cooled down gas stream that is separated from the combined water stream in step (c) may be further processed to remove and recover its carbon dioxide content. Preferably, the carbon dioxide is recovered as a concentrated stream comprising at least 80% carbon dioxide, more preferably at least 90% carbon dioxide.

To recover the carbon dioxide content in the cooled down gas stream, the technique of solvent extraction may for example be used. The use of organic solvents or aqueous solutions of organic solvents for removing carbon dioxide from a gas stream is known. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series and also EP 551 876. Preferably, a regenerable absorbent solvent is used in a continuous process.

The cooled down gas stream, especially the carbon dioxide recovered as a concentrated carbon dioxide stream, may be used in enhanced oil recovery to recover hydrocarbons from a subsurface reservoir. Alternatively, the carbon dioxide recovered from the cooled down gas stream may be sequestrated in a subsurface formation.

Typically, the pressure of the recovered carbon dioxide stream is boosted before it is used to recover hydrocarbons from a subsurface reservoir or sequestrated. Preferably, the pressure is boosted to a level sufficient to allow the carbon dioxide stream to enter the subsurface formation. Typically, the captured carbon dioxide stream is cooled further during pressure boosting.

The cooling process according to the invention is advantageously used for cooling flue gas from a steam methane reforming unit that is used in a Fischer-Tropsch plant to produce hydrogen-rich synthesis gas from steam and methane.

The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst.

DETAILED DESCRIPTION OF THE DRAWING

The process according to the invention will now be further illustrated, by way of example only, with reference to FIG. 1. FIG. 1 is a flow diagram showing a cooling circuit for steam methane reforming flue gas.

In FIG. 1, there is shown a cooling circuit 10 comprising a first cooler 11, a cooling tower 12, and a storage tank 13. The cooling circuit 10 is used to cool hot steam methane reforming (SMR) flue gas 14 containing carbon dioxide and water vapour. As described in more detail below, most of the water within the flue gas is removed from the flue gas stream to leave a stream 15 comprising carbon dioxide, other gases and a little water at a reduced temperature. This stream 15 can then proceed to a carbon dioxide removal and recovery process (not shown), for example a solvent extraction process using an amine-comprising solvent.

Water is used to cool SMR flue gas so that it is at a temperature suitable for carbon dioxide capture. Water is also lost from cooling circuit 10, specifically from cooling tower 12 and so make-up water 16 may have to be added. The amount of water lost from cooling tower 12 varies with the prevailing temperature, since less water is lost in the cooling tower 12 during the night when the temperature is typically at a minimum compared to the amount of water lost in cooling tower 12 during the day, when the temperature typically reaches a maximum. Accordingly, storage tank 13 is provided downstream of cooling tower 12 to store any surplus water which will typically accrue during the cooler night-time hours. This water can then be used during the hotter daytime hours thus saving on the amount of make-up water 16 required.

The process of the present invention is particularly suitable for use in hot climates where the provision of fresh water is expensive and where the temperature variance throughout a 24-hour period is significant.

For illustration purposes only, the presence of water at various points on cooling circuit 10 has been clarified by co-efficients p and u; and variables a and b.

Referring to FIG. 1, SMR flue gas 14 comprising water vapour and carbon dioxide is directed into first cooler 11. Typically, the SMR flue gas also comprises other gases such as butane, propane, carbon monoxide and inerts such as nitrogen. The temperature of the SMR flue gas before entry into the first cooler 11 is typically around 160-200° C. and the pressure is around 1-2 bar. A cooling water stream comprising $uH_2O$ at a temperature of around 20-60° C. is mixed with the SMR flue gas, to condense most of the water ($pH_2O$) present in the SMR flue gas and cool the SMR flue gas to around 40-60° C. The cooled SMR flue gas is separated from most of the water, although a little amount of water remains, and can then proceed to a $CO_2$ recovery process (not shown).

A combined water stream $(p+u)H_2O$ proceeds to cooling tower 12. The temperature of the combined water stream $(p+u)H_2O$ before it reaches cooling tower 12 is typically in the range of from 30 to 80° C., preferably of from 40 to 70° C.

In cooling tower 12, the combined water stream $(p+u)H_2O$ is cooled to a temperature in the range of from 30 to 60° C. by using air 17 from the atmosphere. A proportion $a(p+u)H_2O$ of the combined water stream $(p+u)H_2O$ is evaporated causing the remaining combined water stream to cool. The proportion $a(p+u)H_2O$ of water evaporated from cooling tower 12 is dependent upon the temperature of the air received from the atmosphere which in turn is dependent upon outside temperature at that particular moment. A proportion $b(p+u)H_2O$ of the combined water stream does not evaporate in cooling tower 12 and proceeds to storage tank 13. The relative values of a and b thus vary due to air temperature and thus vary over a 24-hour period, but a+b=1.

In the cooler hours, typically during the night, the amount of water evaporated, $a(p+u)H_2O$, in cooling tower 12 may be less than the amount of water vapour condensed from the SMR flue gas in first cooler 11, $pH_2O$. Therefore, there will a surplus water in cooling circuit 10 and this can be stored in water tank 13. When the temperature of the air injected into the cooling tower 12 is higher, then the amount of water $a(p+u)H_2O$ lost from cooling tower 12 may be more than the amount of water $pH_2O$ condensed from the SMR flue gas. Therefore, water will need to be added to the cooling circuit. This water can be taken from storage tank 13 when available, and make-up water 16 only needs to be added when storage tank 13 is dry or has insufficient water, i.e. less than the amount $uH_2O$ required as cooling water stream.

Thus, an amount of $b(p+u)H_2O$ water enters storage tank 13 and water stored in tank 13 is used as the cooling water stream and directed to first cooler 11. Where no or insufficient water is in the tank 13, i.e. less than $uH_2O$, make up water 16 is added to the cooling water stream.

Thus, embodiments of the present invention benefit in that less make-up water 16 is required over a 24 hour period.

What is claimed is:

1. A process for cooling down a hot flue gas stream comprising water vapour and carbon dioxide, the process comprising:
   (a) heat exchange between the hot flue gas stream and a cooling water stream so that the hot flue gas stream is cooled to a cooled down gas stream at a temperature at which at least part of the water vapour therein has condensed and the cooling water stream increases in temperature;
   (b) combining the condensed water vapour and the cooling water stream to produce a combined water stream;
   (c) separation of the cooled down gas stream from the combined water stream;
   (d) cooling the combined water stream by contact with air from the atmosphere and by evaporation of a portion of the combined water stream;
   (e) using at least part of any non-evaporated and cooled water of the combined water stream as at least part of the cooling water stream for cooling the hot flue gas stream in step (a); and
   (f) storing any non-evaporated and cooled water of the combined water stream that is not used in step (e) and using the stored water later as at least part of the cooling water stream in step (a).

2. A process as claimed in claim 1, wherein the hot flue gas stream is selected from the group consisting of a gas turbine flue gas, a furnace flue gas, a hot oil furnace flue gas, a preheater flue gas, and a reformer flue gas.

3. A process as claimed in claim 1, wherein the hot flue gas stream has a temperature in the range of from 120 to 360° C.

4. A process as claimed in claim 1, wherein the combined water stream produced in step (b) has a temperature in the range of from 30 to 80° C.

5. A process as claimed in claim 1, wherein the combined water stream is directly contacted with the air in a cooling tower.

6. A process as claimed in claim 1, wherein when the amount of water vapour condensed in step (a) is more than the amount of water which is evaporated in step (d), a portion of the non- evaporated and cooled water of the combined water stream is stored in a storage tank.

7. A process as claimed in claim 6, wherein at least a portion of the water stored in the storage tank is used when the amount of water vapour condensed in step (a) is less than the amount of water evaporated in step (d).

8. A process as claimed in claim 1, which is a continuous process over at least one night time hour and at least one daytime hour.

9. A process as claimed in claim 1, wherein the cooled down gas stream is processed to recover its carbon dioxide.

10. A process as claimed in claim 9, wherein the carbon dioxide is sequestrated in a subsurface formation.

11. A process as claimed in claim 9, wherein the carbon dioxide is used in enhanced oil recovery to recover normally liquid hydrocarbons from a subsurface reservoir.

* * * * *